ABSTRACT OF THE DISCLOSURE

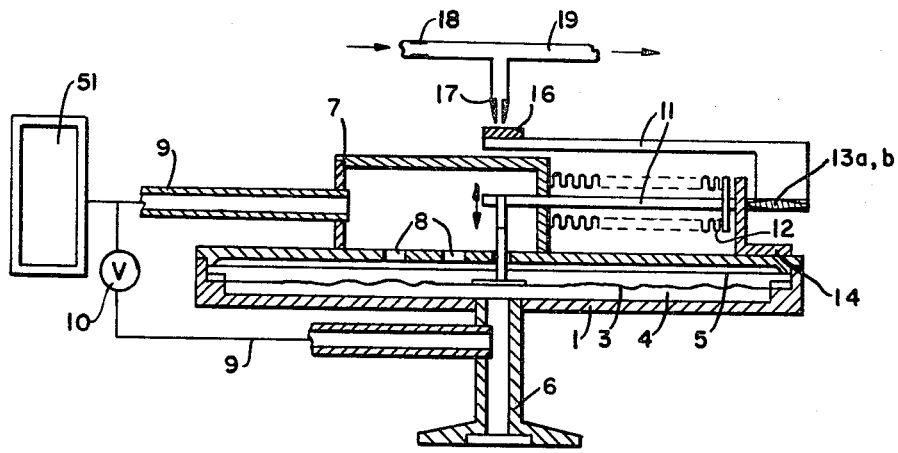
FIG.1.
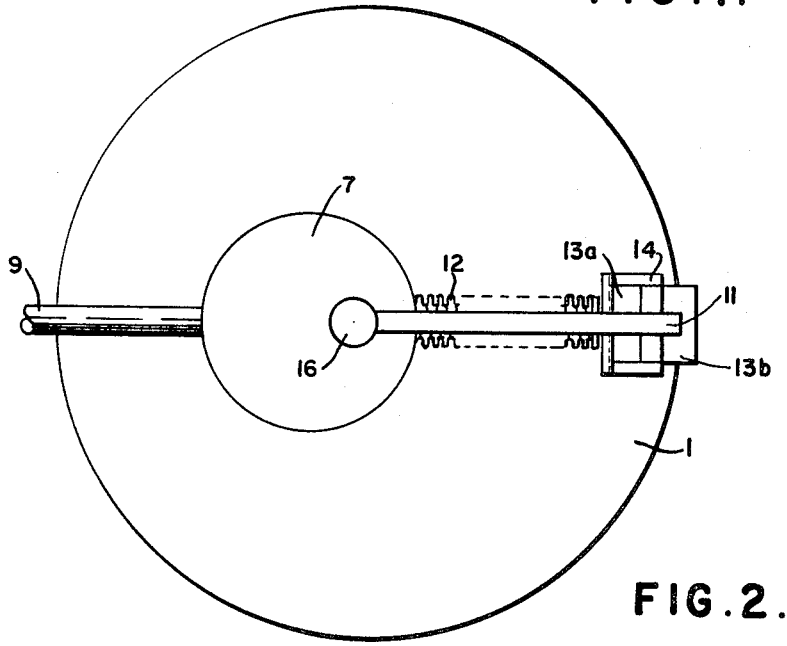
FIG.2.
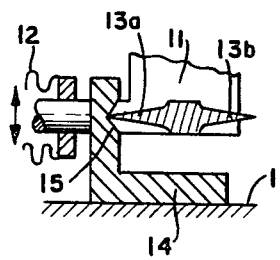
FIG.3a.
FIG.3b.
INVENTORS
Albrecht Elsner
Gustav Klipping &
Gerd Hildebrandt
BY Spencer & Kaye
ATTORNEYS 3,412,568
PRESSURE REGULATOR FOR BATH CRYOSTATS
Albrecht Elsner, Kronach, Upper Franconia, and Gustav Klipping and Gerd Hildebrandt, Berlin, Germany, assignors to Max-Planck-Gesellschaft zur Forderung der Wissenschaften e.V., Gottingen, Germany
Filed June 6, 1967, Ser. No. 643,952
Claims priority, application Germany, June 10, 1966, M 69,800
15 Claims. (Cl. 62—50)

A pressure regulator for maintaining a constant pressure in a bath cryostat and including a pressure regulating valve having a control input communicating with the interior of the cryostat and an output connected to control the output pressure of a pneumatic signal producing device, and a bellows control valve for selectively connecting the interior of the cryostat with a vacuum pump and connected to be controlled by the output of the pneumatic signal producing device.

BACKGROUND OF THE INVENTION

The present invention relates to a control device for cryostats, and particularly to a control device for regulating the pressure in the interior of bath cryostats.

It is known that temperatures below the boiling point of low-boiling coolants, particularly of liquid helium, can be created by reducing the pressure above a boiling coolant bath in a cryostat. In order to attain predetermined temperatures in this region (e.g., helium: below 4.2° K.; hydrogen: below 20.4° K.; nitrogen: below 77.3° K.) and maintain them constant, it is necessary to reduce the pressure above the bath to the value corresponding to such predetermined temperature and to maintain this pressure constant.

This has previously been achieved by selecting a temperature having a value below the boiling point and corresponding, for example, to the predetermined maximum suction power of the pump utilized. (See S. C. Abrahams, Review of Scientific Instruments, volume 31 (1960) 174–176, particularly p. 176.) When one of several temperatures below the boiling point was to be selected, the speed of the pump was varied, for example (see W. R. Scott, and J. Crangle, Journal of Scientific Instruments (1961) 436–438, particularly pp. 437–438) or a manually, mechanically or electrically controlled valve of various types of construction was placed in the suction line between the cryostat and the pump in order to throttle the suction power of the vacuum pump (see, for example, I. Simon, Review of Scientific Instruments, volume 20 (1949) 832–833; and H. S. Sommers, Jr., Review of Scientific Instruments 793–798, particularly pp. 793–794).

While these devices permit the setting and maintenance of very constant temperatures, they are all restricted to utilization for the discontinuous operation of cryostats, i.e., the cryostat is filled once, the temperature is lowered to the desired value and then maintained constant in continuous operation until the level of the coolant bath has dropped to the minimum permissible level. The amount of gas developing in the cryostat per unit of time remains fairly constant during continuous operation.

On the other hand, so-called universal regulators for maintaining constant pressure values are known in various industrial processes. These are pneumatic regulators in which the control value, i.e., the pressure to be controlled, introduced via a measuring transducer, is compared with a reference value and the resulting difference is amplified by means of a compressed-gas system and is used to control a control valve. Usually, the reference value is furnished by a nominal-pressure generator, for example, a compressed-gas line with a reduction valve. The amplification in such devices is varied either by adjusting the nozzle of the compressed-gas system in the longitudinal direction of the movable lever arm of the regulator, or by varying the pivot point of the lever arm on the regulator (see, for example, E. Pavlik, and B. Machei, Ein kombinierter Regler für die Verfahrensindustrie [A Combined Regulator for Industrial Processing] published by R-Olenbourg-Verlag, Munich, 1960). Such regulators would not be capable of maintaining constant pressures below one atmosphere in cryostats because their sensitivity is too low. The control valve could be introduced into the regulator only by means of a measuring transducer and there would thus result substantial dead times which would considerably reduce the responsiveness, and hence the quality, of the control. Moreover, the utility of such a regulator is limited by the measuring range of the measuring transducer. Either the measuring range is large and the sensitivity relatively low, or the measuring range is limited to a relatively small range with increased sensitivity.

SUMMARY OF THE INVENTION

It is therefore a primary object of the present invention to overcome the above-noted drawbacks and difficulties found in prior art cryostat pressure-regulating systems.

Another object of the present invention is to provide an improved pressure control for bath cryostats.

Yet another object of the present invention is to provide a continuous control of this pressure.

A yet further object of the present invention is to provide a cryostat pressure control of simplified construction.

Still another object of the present invention is to provide a cryostat pressure control having a rapid response and capable of operating over a wide pressure range.

A still further object of the present invention is to directly control the communication between the interior of a cryostat and a suction pump as a function of pressure fluctuations within the cryostat.

These and other objects according to the present invention are achieved by the provision of a novel control device for regulating the pressure in a bath cryostat having a waste gas line in communication with its interior. The control device according to the present invention essentially includes pneumatic pressure regulator means having a control input communicating with the cryostat interior and an output producing a pressure whose value varies as a function of the pressure at its control input, and pneumatically controllable valve means disposed in the cryostat waste gas line and having a control pressure input to actuate the control valve means for opening and closing the waste gas line in response to the output pressure from the regulator means.

According to a preferred embodiment of the present invention, the output of the regulator means includes a pneumatic pressure amplifying system producing at its output a pressure which varies in proportion to variations in the pressure at the regulator means control input, the output of this system being connected to the input of the control valve means. In further accordance with a preferred embodiment of the present invention, the valve means are constituted by a bellows control valve.

BRIEF DESCRIPTION OF THE DRAWINGS

FIGURE 1 is a cross-sectional view of a pressure regulator used in embodiments of the present invention.

FIGURE 2 is a plan view of the pressure regulator of FIGURE 1.

FIGURE 3a is a detail view of a portion of the device of FIGURE 1.

FIGURE 3b is a view similar to that of FIGURE 3a of a modified version of the device.

DESCRIPTION OF THE PREFERRED EMBODIMENTS

Figure 4:
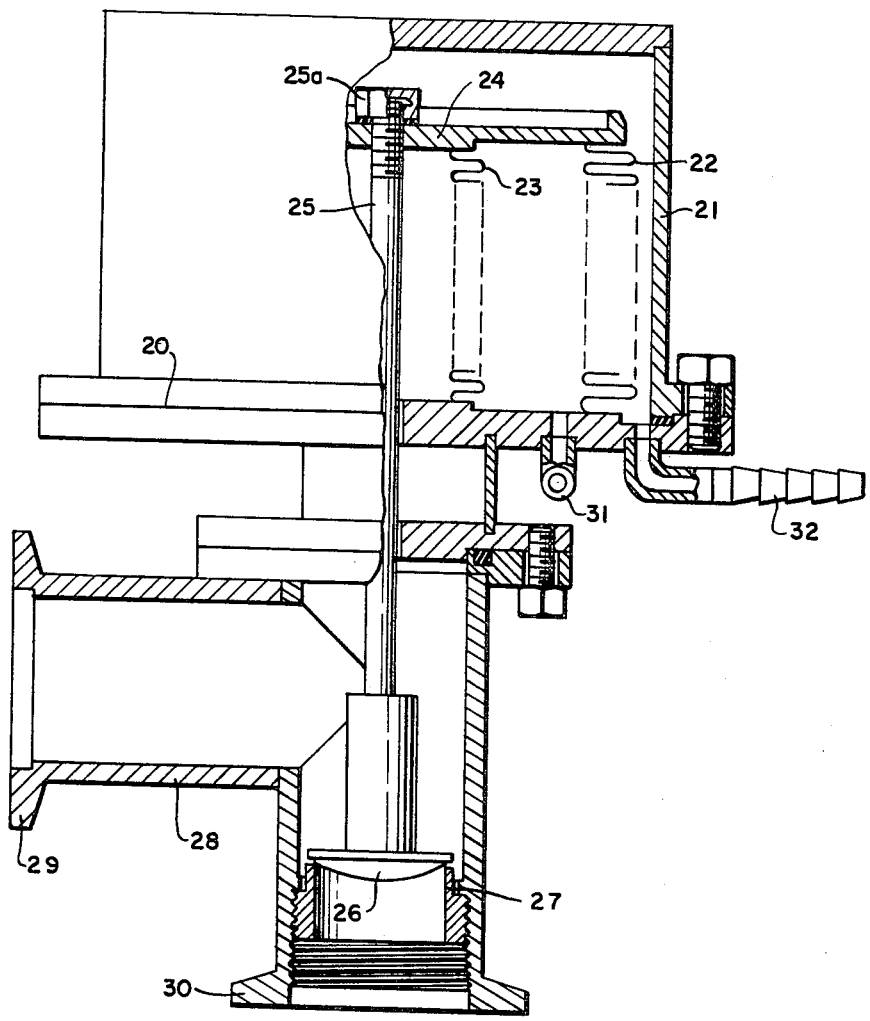
FIGURE 4 is a cross-sectional view of a pneumatically controllable bellows control valve used in embodiments of the present invention.

In order to be able to set pressure values, particularly subatmospheric pressures, and to maintain them automatically at a constant level in bath cryostats, even with a greatly fluctuating amount of exhaust gas, it is proposed, according to the present invention, to couple the interior of the cryostat with the input side of a pneumatic pressure regulator whose output side is preferably in communication, via a compressed-air system, with the control pressure input of a pneumatically controllable bellows control valve disposed in the waste gas line of the cryostat. It can be advantageous to give the pressure regulator the form of a diaphragm container whose nominal-value surge chamber can be placed in communication with the regulator input via a bypass line provided with a cut-off valve.

FIGURE 1 shows a pressure regulator of the type which may be used according to the present invention and consisting of a diaphragm container 1, the interior of the container being divided by the gas-tight diaphragm 3 into a surge chamber 4 communicating with the pressure to be regulated and a surge chamber 5 whose interior is at a nominal, or reference, pressure. In communication with surge chamber 4, a connection 6 is provided which serves to connect the pressure regulator with the cryostat (not shown here, but shown as element 35 in FIGURE 6). Another container 7 of smaller cross section is placed on top of the diaphragm container 1 and has its interior in communication with the surge chamber 5 of the diaphragm container via bores 8. The container 7, and thus the surge chamber 5 for the nominal pressure, is coupled to the input connection 6 of the pressure regulator via a bypass line 9 which can be closed off by a cut-off valve 10. When the apparatus has to meet particularly exacting performance requirements, a supplemental thermally insulated container 51 can have its interior coupled via the bypass line 9 to the nominal-pressure surge chamber 5 to maintain the nominal pressure at a constant value.

One end of a rocker 11 rests on the middle of diaphragm 3, the lever leading to the outside through bores in the diaphragm container 1 and in the container 7 disposed thereon. The interior of container 7 is sealed off by a bellows 12 at the point where rocker 11 passes through the wall of container 7, the interior of bellows 12 being in communication with the interior of container 7. The bellows has one end attached to the container 7, and its other end is attached to the rocker 11 near the pivot point of the latter.

The rocker 11 is mounted on a double-bladed knife-edge 13a, b extending from both sides of the rocker. One blade of the knife-edge 13a, b rests in a wedge-shaped groove 15 constituting the rocker fulcrum and disposed in an elbow or right-angle piece 14, which is slotted to permit the passage of rocker 11. This arrangement is best shown in FIGURES 3a and 3b. The elbow 14 is mounted on the diaphragm container 1 and is pivotable about a vertical axis through an angle of 180° between the positions shown in FIGURES 3a and 3b.

A deflecting plate 16 is disposed at the outer end of the upper arm of rocker 11. Above the deflecting plate 16 there is a nozzle 17 of a pneumatic system which acts to amplify the signal emanating from the pressure regulator, i.e., the indication produced by the regulator as a function of the pressure differential between chambers 4 and 5. Compressed air is fed to the pneumatic system via a throttle 18, and air at the control pressure employed to control a bellows control valve exists via the control line 19.

When compressed air at a constant pressure is fed to throttle 18, this air is divided between nozzle 17 and control a bellows control valve exits via the control line 19. mined by the distance between the outlet end of that nozzle and the deflecting plate 16, this distance being a function of the deflection of diaphragm 3 under the influence of the pressure differential between chambers 4 and 5. Thus the air flow through control line 19, and hence the pressure in that control line, is also determined by the deflection of diaphragm 3. Control line 19 is connected to operate the controllable valve means employed for controlling the exhaust of gas from the bath cryostat. This is shown more clearly in FIGURE 6, to be described below, where the control line is given the reference numeral 46 and is connected to control the opening and closing of bellows control valve 42.

FIGURE 2 is a plan view of a portion of the arrangement of FIGURE 1 and shows the knife-edge 13a, b extending laterally in both directions from the rocker 11. As is shown in FIGURES 3a and 3b, when the regulator is used in the subatmospheric pressure range, the knife-edge 13a pointing in the direction toward the bellows 12 serves as the pivot for rocker 11, whereas when the regulator is used in the above-atmospheric pressure range, elbow 14 is rotated by 180° and the knife-edge 13b pointing in the opposite direction serves as the rocker pivot.

The knife-edge is held in notch, or groove, 15 by the action of bellows 12. Thus, when the regulator is operating in the subatmospheric pressure range, with elbow 14 in the position shown in FIGURE 3a, the pressure inside bellows 12 is lower than the ambient pressure, i.e., the pressure in the region surrounding the bellows, so that the bellows tends to contract and pulls edge 13a into groove 15. Conversely, in the above-atmospheric pressure range, with elbow 14 in the position shown in FIGURE 3b, the pressure within bellows 12 is greater than the ambient pressure and bellows 12 tends to expand so as to push edge 13b into notch 15. This arrangement thus permits a single knife-edge 13a, b to support the rocker 11.

Upon initiation of operation of the pressure regulator, the valve 10 in the bypass line 9 between the nominal-pressure surge chamber 5 and the input connection 6 and the surge chamber 4, which latter is in communication with the cryostat, for example, is first opened. The pressure within the cryostat is reduced, with the aid of a vacuum pump, to the desired value and then the valve 10 is closed. Thus, the desired nominal, or reference, pressure is created in the surge chamber 5. If the pressure in the cryostat then rises above the nominal value, the diaphragm 3 is urged upwardly and the rocker 11 is correspondingly pivoted in a clockwise direction, thus moving the deflecting plate 16 against the nozzle 17. This results in an increase in the control pressure delivered to the bellows control valve. An increase in the control pressure acts to open the control valve, and hence the connection between the vacuum pump and the cryostat, so as to cause the excess pressure in the cryostat to decrease until it returns to the preset nominal value. The degree of amplification of the regulator output can be varied by changing the supply pressure of the pneumatic system.

FIGURE 4 is a partly cut-away view of one type of bellows control valve which can be used in embodiments of the present invention. In a valve housing 20 having a removable cap 21, two concentric bellows 22 and 23 are inserted and have their free ends coupled to a common cover plate 24. Through the cover plate 24 a valve rod 25 is inserted by means of a gas-tight screw coupling 25a, the rod 25 having a valve element 26, here shown as a mushroom valve, at its free end. The valve rod 25 extends out of the valve housing 20 proper and a seat 27 for the valve 26 is disposed within the elbow pipe 28 mounted on the valve housing 20, the elbow pipe 28 being inserted into the waste gas line of the cryostat (line 41 of FIGURE 6) and connected thereto by means of connecting flanges 29 and 30. The interior of the bellows 23 is in communication, via annular passages around rod 25, with the subatmospheric pressure existing in the waste gas line.

The amplified output from the pressure regulator is brought into the annular space between the two bellows 22 and 23 via a connection 31. In the valve housing, outside of the bellows 22, atmospheric pressure is maintained when the pressurized gas connection line 32 is opened. Whenever it is necessary to adapt the operating range of the bellows control valve to the control pressure, whose value is a function of the amplification factor of the pressure regulator, pressures above atmospheric can be created in the valve housing 20 via the pressurized-gas connection line 32.

Figure 5:
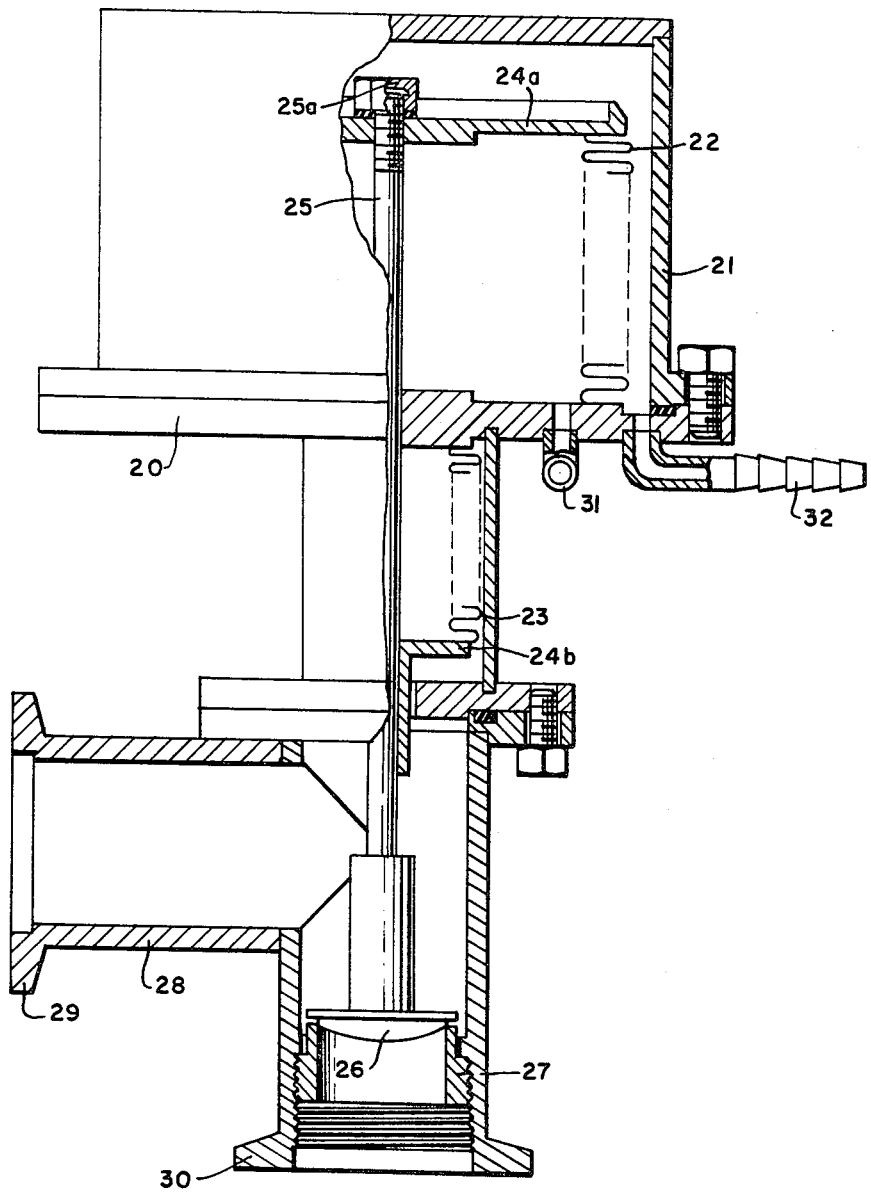
FIGURE 5 is a cross-sectional view of another form of construction of the element of FIGURE 4.

FIGURE 5 shows another version of the bellows control valve in which the bellows 22 and 23 are disposed not one inside the other but one above the other. Bellows 22 has its movable end connected to a cover plate 24a and bellows 23 has its movable end connected to a cover plate 24b which is mounted on rod 25 to form a seal therewith. In all other respects, the construction is similar to that of the device shown in FIGURE 4. This type of construction has certain advantages with respect to manufacture and accessibility of the components for eventual repairs.

During operation, the control pressure is communicated to the interior of both bellows from the pressure regulator via connection 31. When the control pressure exceeds a certain value, which depends jointly on the pressure in the valve housing, the pressure in the waste gas line and the dimensions of the valve, the bellows 22 and 23 expand, the valve element 26 is lifted off its seat 27 by the action of cover plate 24a on coupling 25a and the connection to the vacuum pump is thus opened.

Figure 6:
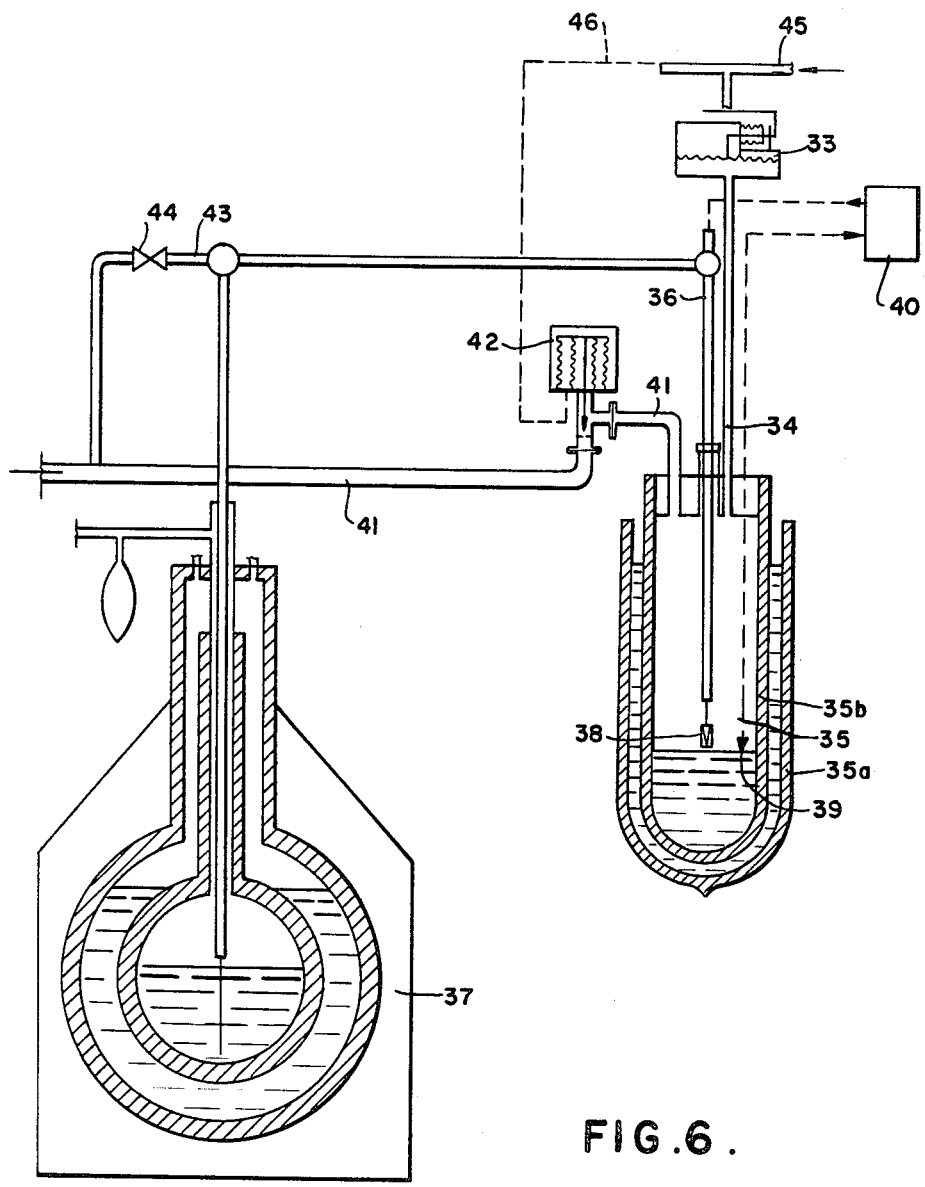
FIGURE 6 is a simplified view of an arrangement provided with a preferred embodiment of the present invention.

FIGURE 6 shows an embodiment of the pressure regulating device in simplified form. The pressure regulator 33 is directly connected to the interior of a cryostat 35 via a connection line 34. The cryostat 35, which here consists of two Dewar vessels 35a and 35b, arranged one inside the other, with the outer one, 35a, being filled with liquid nitrogen, whereas the inner one, 35b, contains liquid helium, is coupled, via a vacuum-jacketed siphon 36 having a waste gas-cooled radiation shield, to a storage container 37 containing liquid helium. The end of the siphon 36 disposed within the cryostat 35 is preferably provided with an expansion valve 38 enclosed by a container of sintered metal, the valve 38 being electromagnetically operated by a control device 40 actuated by an electrical liquid level sensor 39. The interior of the cryostat 35 is in communication with a vacuum pump (not shown), via an exhaust gas line 41 connected to the bellows control valve 42. By means of this vacuum pump, the pressure in the cryostat in the space above the liquid helium bath is reduced.

An exhaust gas line 43 serves to cool the radiation shield of the siphon 36 and preferably contains a valve 44 to adjust the quantity of waste gas flowing through the siphon. In addition, line 43 is also in communication with the waste gas line 41. The pressurized gas flow serving to amplify the signal of the pressure regulator 33 is brought to the pressure regulator 33 via the throttle valve 45 from a pressurized gas source (not shown). The control pressure furnished by the pressure regulator 33 is communicated to the bellows control valve 42 via the control line 46.

In operation the cryostat 35 is first filled with liquid helium to the desired level and the pressure within the cryostat 35, and thus the temperature of the helium bath, is reduced to the desired value with the bypass line on the pressure regulator 33 (9 in FIGURE 1, not shown here for reasons of clarity) opened. Then the bypass line on the regulator 33 is closed.

When, after the desired operating state has been reached, the liquid in cryostat 35 drops below the desired level, which is determined by the location of the level sensor 39, the expansion valve 38 on the siphon 36 is opened and the replenishing process of expanding and cooling the normally boiling helium from storage container 37 is initiated and continues until the desired level is restored. During the replenishing process the pressure within the cryostat tends to climb above the set value. However, the pressure regulator 33 immediately responds, opens the bellows control valve 42 accordingly and thus causes a constant pressure to be maintained.

The apparatus according to the present invention is distinguished, in contrast to the known universal regulators, by its simplified construction and the increased sensitivity of its response. Since the control pressure value, or set nominal pressure, is applied directly to the regulator, the conventional measuring transducer is eliminated, no dead times exist and the regulator possesses a continuously high sensitivity over the entire measuring range. Moreover, the measuring range of the regulator is particularly wide.

No special nominal value pressure generator is required to produce the set reference value because the reference value is furnished directly from the controlled system.

The adjustment of the amplification factor of the regulator control output is effected in the most simple manner by setting a corresponding input pressure in the pneumatic system and not by any mechanical adjustment of the regulator.

A particular advantage of the apparatus of the present invention lies in the fact that the bellows permitting the rocker to pass into the nominal pressure region in a gastight manner exerts a force on the rocker pivot blade which acts in a direction to hold the blade against its support, this force being due to the difference in pressure between the interior and the exterior of the bellows. This arrangement makes possible the utilization of a knife-edge mounting which is particularly advantageous due to the extremely low frictional resistance which it offers to rocker movement.

The regulator can be operated over a wide pressure range because a simple adjustment of the position of the elbow supporting the knife-edge achieves change-over from the subatmospheric pressure range to the above-atmospheric pressure range. Thus, the regulator is also suitable, for example, for the operation of cryostats utilizing helium at a temperature above its boiling point of 4.2° K. or in the supercritical range above 5.2° K.

Of further advantage is the possibility of adapting the operational range of the bellows control valve to the pressure regulator in order to permit the system to operate under optimum conditions.

In comparison with the previously known control valves for maintaining set constant vacuum pressures in cryostats, the device according to the present invention has the advantage that the pressure can be maintained constant even when the amount of exhaust gas in the cryostat fluctuates excessively because of a sudden high heat load or during the addition of coolant.

The device according to the present invention can be employed with particular advantage for the continuous operation of helium bath cryostats in the temperature range below 4.2° K. The addition of normally boiling coolant is hereby advisably effected via a vacuum-jacketed siphon having a waste gas-cooled radiation shield (see: G. Klipping, Chemie-Ingenieur-Technik [Art of Chemical Engineering], vol. 36 (1964), pp. 430–441, particularly p. 441), the end of the siphon within the cryostat being provided with an expansion valve so that the normally boiling coolant expands when it enters through the valve into the cryostat, whose interior is at a reduced pressure, whereby a portion of the normally boiling liquid evaporates and the remaining liquid is cooled to the temperature of the bath.

The expansion valve is suitably a plug valve with linear sealing and having a valve stem passing through the siphon to the outside in a gas-tight manner and which is preferably operated electromagnetically. The expansion valve is advantageously surrounded at its outlet side by a completely closed hollow cylinder of sintered metal to separate the gas and liquid phases exiting from the valve. To control the expansion valve it is advisable to use an electrical sensor which is shielded by a container with a bottom of sintered metal, and which is advantageously also disposed at the end of the siphon below the expansion valve, the sensor leads being brought to the outside through the siphon.

During the continuous replenishment of an unsilvered helium bath cryostat made of glass via a siphon of the above-described type provided with an expansion valve, an exemplary pressure regulation achieved by an arrangement according to the present invention resulted in temperatures between 4.2° K. and the λ-point temperature of 2.15° K., the selected temperature being maintained constant, for a constant bath level, for any desired length of time with a relative temperature stability, or constancy, of $\Delta T/T = 3 \cdot 10^{-3}$, even though the amount of exhaust gas during the replenishment operations, which occurred at intervals of one to two minutes, fluctuated by 400 to 600%. When the expansion valve was closed, the pressure variations in the cryostat remained below 1 mb. (millibar), and when the expansion valve was opened, i.e., during replenishment, the variations were only approximately 4 mb.

The pressure regulating device according to the present invention in combination with a siphon having an expansion valve can also be employed for the temperature range below the λ-point if the nominal pressure control value is introduced into the pressure regulator via a suitable measuring transducer. A device which would be suitable for this purpose as a measuring transducer is one in which the temperature of the helium bath is determined with the aid of an electrical sensor and the resulting electrical signal is transformed into a pressure signal to be supplied to the pressure regulator.

It will be understood that the above description of the present invention is susceptible to various modifications, changes and adaptations, and the same are intended to be comprehended within the meaning and range of equivalents of the appended claims.

What is claimed is:

1. A control device for regulating the pressure in a bath cryostat having a waste gas line in communication with its interior, said device comprising, in combination:
   (a) pneumatic pressure regulator means having a control input communicating with the portion of the cryostat interior above the level of the bath therein, a reference input communicating with a source of gas at a nominal pressure, and an output producing a pressure whose value varies as a function of the difference between the pressure at its control input and the nominal pressure; and
   (b) pneumatically controllable valve means disposed in the cryostat waste gas line and having a control pressure input connected to actuate said valve means for opening and closing the waste gas line in response to the output pressure from said regulator means.

2. An arrangement as defined in claim 1 wherein the output of said regulator means comprises a pneumatic pressure amplifying system producing at its output a pressure which varies in proportion to variations in the pressure at said regulator means control input, the output of said system being conneced to the input of said valve means.

3. An arrangement as defined in claim 1 wherein said valve means is a bellows control valve.

4. An arrangement as defined in claim 3 wherein said pressure regulator means comprise: a diaphragm container; a gas-tight diaphragm dividing the interior of said container into a first chamber communicating with said regulator means control input and a second chamber for containing gas at a reference pressure; a bypass line connecting said regulator means control input to said second chamber in communicating relationship; and a cut-off valve inserted in said bypass line for isolating said second chamber from said regulator means control input.

5. An arrangement as defined in claim 4 wherein said pressure regulator means further comprise: a pivotable rocker having one free end resting on said diaphragm; and a double-bladed knife-edge rigidly connected to said rocker with one of its edges constituting the pivot for said rocker.

6. An arrangement as defined in claim 5 wherein said pressure regulator means further comprise a bellows mounted on said container so as to have its interior in communication with said second chamber, having a free end coup'ed to said rocker, near the pivot point thereof, in a gas-tight manner, and having one arm of said rocker passing therethrough in a longitudinal direction.

7. An arrangement as defined in claim 6 wherein one of the edges of said knife-edge extends toward said bellows and the other edge thereof extends away from said bellows, said edge extending toward said bellows constituting the pivot for said rocker when the pressure in said second chamber is below atmospheric and said edge extending away from said bellows constituting the pivot for said rocker when the pressure in said second chamber is above atmospheric.

8. An arrangement as defined in claim 7 wherein said pressure regulator means further comprise a right-angle piece mounted on said container and having a groove for receiving one edge of said knife-edge, said piece being pivotable through an angle of 180°.

9. An arrangement as defined in claim 4 further comprising a thermally insulated container defining a supplemental volume, said container being connected to said bypass line so that the volume thereof is in continuous communication with said second chamber.

10. An arrangement as defined in claim 1 wherein said controllable valve means comprise: a housing; two bellows disposed within said housing and each having one end connected to said housing; a valve rod connected to the free end of said bellows; and a valve element disposed within the cryostat waste gas line and mounted on said valve rod.

11. An arrangement as defined in claim 10 wherein said two bellows are disposed one inside the other and both have their free ends connected to said valve rod.

12. An arrangement as defined in claim 10 further comprising connecting means connected to said housing for placing the region between said two bellows in communication with said regulator means output.

13. An arrangement as defined in claim 10 wherein said controllable valve means further comprises connecting means for delivering compressed air into said housing.

14. An arrangement as defined in claim 10 wherein said controllable valve means further comprises an elbow pipe mounted on said housing and connectable into the waste gas line of the cryostat, and a valve seat disposed in said pipe for receiving, and forming a blocking seal with, said valve element.

15. An arrangement as defined in claim 10 wherein said two bellows are disposed one below the other and both have their free ends connected to said valve rod.

References Cited

UNITED STATES PATENTS

| | | | |
|---|---|---|---|
| 3,292,383 | 12/1966 | Charles et al. | 62—50 |
| 3,307,367 | 3/1967 | Klipping et al. | 62—49 |

LLOYD L. KING, *Primary Examiner.*